US007324509B2

(12) United States Patent
Ni

(10) Patent No.: US 7,324,509 B2
(45) Date of Patent: Jan. 29, 2008

(54) EFFICIENT OPTIMIZATION ALGORITHM IN MEMORY UTILIZATION FOR NETWORK APPLICATIONS

(75) Inventor: Shih-Hsiung Ni, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1301 days.

(21) Appl. No.: 10/082,077

(22) Filed: Feb. 26, 2002

(65) Prior Publication Data

US 2002/0124149 A1    Sep. 5, 2002

Related U.S. Application Data

(60) Provisional application No. 60/272,341, filed on Mar. 2, 2001.

(51) Int. Cl.
*H04L 12/50* (2006.01)
*H04Q 11/00* (2006.01)

(52) U.S. Cl. .................. 370/381; 370/374; 370/395.7; 370/428

(58) Field of Classification Search ............... 370/466, 370/467, 469 X, 474 X, 471 X, 413, 389, 370/229, 474; 711/5, 157
See application file for complete search history.

(56) References Cited

U.S. PATENT DOCUMENTS

| 5,182,801 A | * | 1/1993 | Asfour ..................... 709/214 |
| 5,313,603 A | * | 5/1994 | Takishima ................. 711/157 |
| 5,390,308 A | | 2/1995 | Ware et al. |
| 5,423,015 A | | 6/1995 | Chung |
| 5,634,015 A | * | 5/1997 | Chang et al. ............... 710/310 |
| 5,644,784 A | | 7/1997 | Peek |
| 5,701,434 A | * | 12/1997 | Nakagawa .................. 711/157 |
| 5,742,613 A | | 4/1998 | MacDonald |
| 5,802,543 A | * | 9/1998 | Shibayama ................. 711/5 |
| 5,898,687 A | | 4/1999 | Harriman et al. |
| 5,905,725 A | * | 5/1999 | Sindhu et al. ............. 370/389 |
| 6,061,351 A | | 5/2000 | Erimli et al. |

(Continued)

FOREIGN PATENT DOCUMENTS

WO    99/00939    1/1999

OTHER PUBLICATIONS

Lin, Yu-Sheng and Shung, C. Bernard, "Queue Management for Shared Buffer and Shared Multi-buffer ATM Switches", Department of Electronics Engineering & Institute of Electronics, National Chiao Tung Univeristy, Hsinchu, Taiwan, R.O.C., Mar. 24, 1996.

*Primary Examiner*—Chirag G. Shah
(74) *Attorney, Agent, or Firm*—Squire Sanders & Dempsey L.L.P.

(57) ABSTRACT

A communication device configured to assign a data packet to a memory bank of a memory device is provided. The communication device includes an input port for receiving the data packet, a look-ahead logic module, a pointer assignment module, and an output port. The look-ahead logic module is configured to select an address of the memory bank of the memory device by overriding an address mapping scheme that permits successive data packets to be assigned to the same memory bank. The pointer assignment module is configured to assign a pointer to the data packet based upon the memory bank determined by the look-ahead logic module. In addition, the output port is configured to transfer the data packet to the memory bank of the memory device.

56 Claims, 4 Drawing Sheets

U.S. PATENT DOCUMENTS

| | | |
|---|---|---|
| 6,175,902 B1 | 1/2001 | Runaldue et al. |
| 6,490,248 B1 * | 12/2002 | Shimojo .................... 370/229 |
| 6,724,767 B1 * | 4/2004 | Chong et al. ............... 370/412 |
| 6,745,277 B1 * | 6/2004 | Lee et al. ...................... 711/5 |
| 6,853,643 B1 * | 2/2005 | Hann et al. .................. 370/413 |
| 6,970,478 B1 * | 11/2005 | Nishihara .................... 370/474 |
| 2004/0028067 A1 * | 2/2004 | Chong et al. ............... 370/412 |
| 2004/0215903 A1 * | 10/2004 | Barri et al. .................. 711/148 |

* cited by examiner

EFFICIENT OPTIMIZATION ALGORITHM IN MEMORY UTILIZATION FOR NETWORK APPLICATIONS

REFERENCE TO RELATED APPLICATIONS

This application claims priority of U.S. Provisional Patent Application Ser. No. 60/272,341, filed on Mar. 2, 2001. The contents of this provisional application is hereby incorporated by reference.

BACKGROUND OF THE INVENTION

1. Field of the Invention

The invention relates to a method and apparatus for a memory device such as a Dynamic Random Access Memory (DRAM), and more particularly to a memory device including a common data bus for rapidly manipulating packets in order to store and retrieve the packets in an efficient manner so as to prevent the system from incurring penalties, such as bus turnaround penalties, small packet penalties, and back-to-back write penalties.

2. Description of the Related Art

As computer performance has increased in recent years, the demands on computer networks has significantly increased; faster computer processors and higher memory capabilities need networks with higher bandwidth capabilities to enable high speed transfer of significant amounts of data. Thus, today's main memory systems require exponentially increasing bandwidth in the order of multiple gigabytes per second transfer rate to keep up with the rising processor frequencies and demanding user applications in the area of networking. Historically, these memory systems used commodity DRAMs in wide data paths to accomplish bandwidth requirements. To achieve even greater bandwidth, many methods have been proposed, such as reducing memory read/write turnaround-time, row address strobe (RAS) and column address strobe (CAS) access time, and bank-to-bank conflict.

In a conventional DRAM, the memory system may include a cell array which contains an array of memory banks. An individual memory bank may consist of a transistor which causes a tiny capacitor to be placed in either a charged (i.e., "1") or discharged (i.e., "0") state. Thereby, a single memory bank may be capable of being programmed to store one bit of information. The memory banks may be arranged in rows and columns. Address lines may be used to specify a particular memory bank for access. These address lines may be multiplexed to provide a bit address by using a row address strobe (RAS) signal and a column address strobe (CAS) signal. The RAS signal may be used to clock addresses to a row address register. A row address decoder decodes the address and specify which rows are available for access. Similarly, the CAS signal may be used to clock addresses to the column address register. The column address decoder decodes the address and specify which columns are available for access. Once a particular cell is specified by decoding its row and column, a read/write (R/W) signal is used to specify whether a bit is to be written into that cell, or the bit retained by that cell is to be read out of the memory bank.

With the advent of the Rambus™ DRAM (RDRAM) strides have been made by developing a customized high-bandwidth, low pin count memory interface. In an RDRAM system, the remapping of the addresses is achieved by swapping predetermined bits of the memory address. The swapping of bits has the effect of assigning neighboring rows in an array to different row latches.

Although the RDRAM scheme has greatly reduced the rate of memory bank contentions, a significant drawback of the RDRAM scheme still exists in the manner in which the packets are retrieved from the memory device. When each incoming packet is received, a pointer from a link list is assigned to each packet based upon a first-in first-out (FIFO) scheme. The pointer serves to point to the location where the packet is stored in the memory bank. The RDRAM is a protocol that merely manipulates the storing of the packets by remapping the packets stored in the memory banks. However, the RDRAM does not control the sequence in which the packets are retrieved from the memory banks. Thus, when a readout request is received, the packets may be transferred from the memory device and dequeued to the switch fabric based on many different read request schemes such as a first in first order (FIFO) scheme, a priority request, a weighted round robin request, or an output queue congestion conflict scheme. If the read request is based upon any other request scheme except the FIFO scheme, it is very unlikely that all of the packets will be read out consistently according to the first in first out order in which the packets were stored in the memory banks. This means that after the packets have been accumulated in the packet memory and switched around for a while, the addresses of the adjacent dequeued packets may no longer be located near each other. Consequently, when the packets are read out of the memory banks in a sequence not according to the FIFO scheme, the pointers of the dequeued packets are returned back to the link list in a non-sequential order. Namely, the pointers will re-join the link list in a random order. However, when a write request is received to assign a new incoming packet to the memory banks, the address pointers are then obtained according to availability from the link list and not according to the original sequential order. When the pointers are dequeued from the memory cells and freed back to the link list in a random order so that the address values are not successive, the address remapping scheme in RDRAM no longer works, and it may produce stall cycles for the network due to writing to the same memory device or the same bank base on available pointers in the link list which is now in random order.

In sum, the RDRAM address swapping scheme may be helpful for adjacent addresses that are stored and received according to a FIFO scheme. However, the RDRAM re-mapping scheme suffers considerable drawbacks when non-FIFO reading schemes are used so that the address values are not successive, but random, and the pointers are no longer arranged successively.

SUMMARY OF THE INVENTION

The present invention is drawn to a communication device configured to assign a data packet to a memory bank of a memory device. The communication device includes an input port for receiving the data packet, a look-ahead logic module, a pointer assignment module, and an output port. The look-ahead logic module is configured to select an address of the memory bank of the memory device by overriding an address mapping scheme that permits successive data packets to be assigned to the same memory bank. The pointer assignment module is configured to assign a pointer to the data packet based upon the memory bank determined by the look-ahead logic module. In addition, the output port is configured to transfer the data packet to the memory bank of the memory device.

In another embodiment of the invention, a communication device configured to assign a data packet to a memory bank of a memory device is provided. The communication device includes an input port for receiving the data packet, a look-ahead module, a link list structure, a pointer assignment module, and an output port. The look-ahead logic module is configured to select an address of the memory bank of the memory device so that no two successive request operations access the same memory bank. The link list structure is configured to include multiple independent link lists, wherein each link list is assigned exclusively to a predetermined memory bank. The pointer assignment module is configured to assign a pointer from one of the independent link lists to the data packet based upon the memory bank determined by the look-ahead logic module. Furthermore, the output port is configured to transfer the data packet to the memory bank of the memory device.

In an alternate embodiment the invention is drawn to a method of assigning a data packet to a memory bank of a memory device. The method includes the steps of receiving the data packet at an input port of a communication device and selecting an address of the memory bank of the memory device by overriding an address mapping scheme that permits successive data packets to be assigned to the same memory bank. The method also includes the steps of assigning a pointer to the data packet based upon the memory bank determined by the look-ahead logic module and transferring the data packet to the memory bank of the memory device configured to transfer the data packet to the external memory device.

In another embodiment, a method of assigning a data packet to a memory bank of a memory device is provided. The method includes the steps of receiving the data packet at an input port of a communication device and selecting an address of the memory bank of the memory device so that no two successive request operations access the same memory bank. The steps of providing a link list structure configured to include multiple independent link lists, wherein each link list is assigned exclusively to a predetermined memory bank and assigning a pointer from one of the independent link lists to the data packet based upon the memory bank determined by the look-ahead logic module. In addition, the method includes the step of transferring the data packet to the memory bank of the memory device configured to transfer the data packet to the external memory device.

BRIEF DESCRIPTION OF THE DRAWINGS

The objects and features of the invention will be more readily understood with reference to the following description and the attached drawings, wherein.

DETAILED DESCRIPTION OF THE PREFERRED EMBODIMENTS

Figure 1:
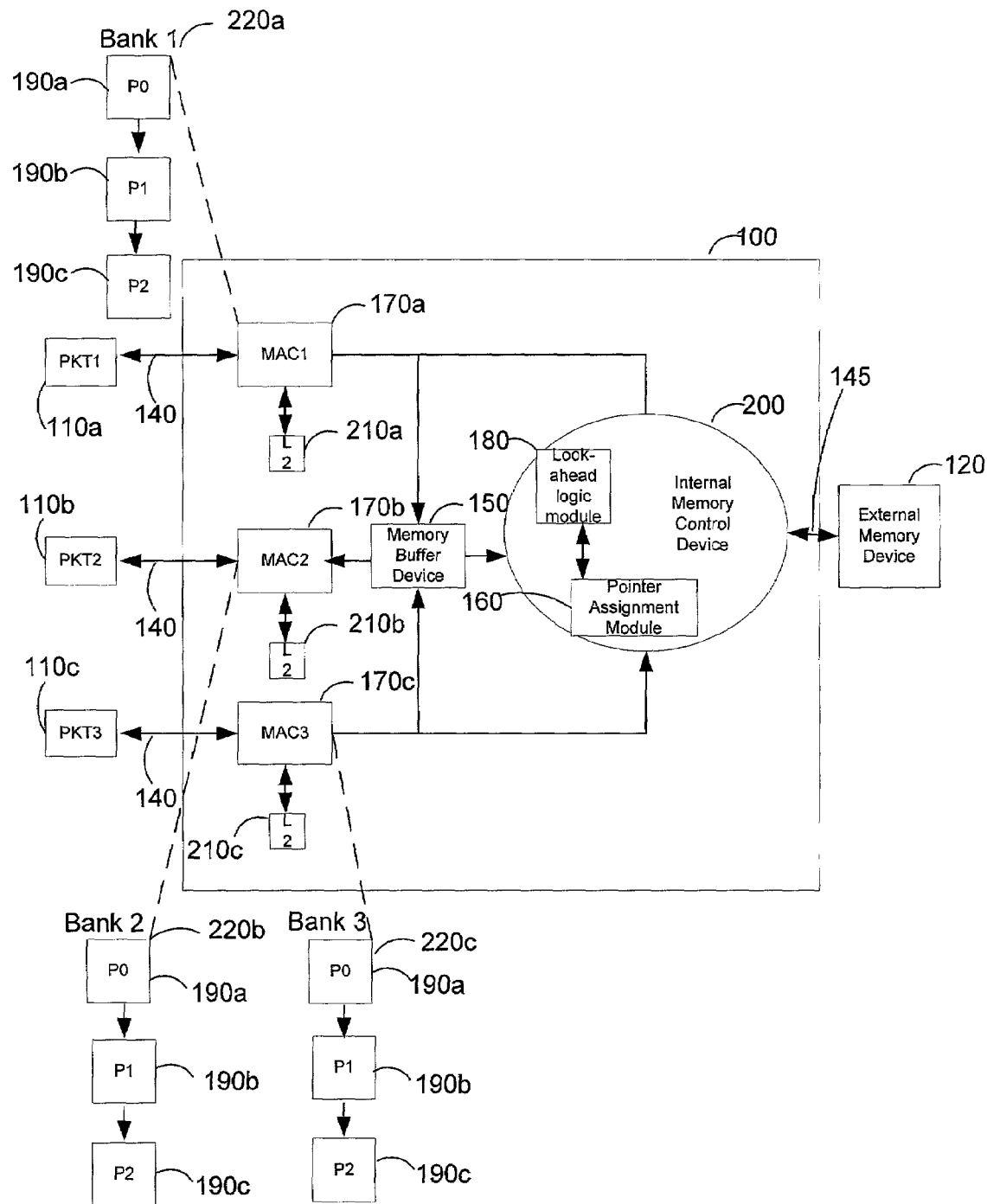
FIG. 1 is a simplified diagram of a system according to one embodiment of the invention.

As shown in FIG. 1, a general description of the flow of a packet 110 traveling through the switch 100 to a memory device 120 may occur, for example, according to the following description. In general, the invention may employ a RDRAM or a similar unit as an external memory device 120. As discussed above, the embodiments of the communication device may be described as employing an RDRAM memory interface. However, other memory devices may be employed such as a SDRAM, DRAM or other speed memory devices.

The switch 100 may interface with the external memory device 120 to access the data stored in the memory banks 130 that are part of a memory device 120. The memory device 120 may be, for example, an external memory device, an on-chip memory device, an on-switch memory device or a network internal memory device. However, in the preferred embodiment, the memory device 120 is an external memory device. When a packet 110 initially arrives at an input port 140 of the switch 100, it will be transferred to a media access control (MAC) device 170 where a pointer assignment module 160 will assign a pointer to each packet. If the packet 110 is smaller than a preprogrammed packet size, a memory buffer device 150 of the switch 100 will temporarily store the packet in a receiver first-in first-out (RX FIFO) until the number of successive packets received into the memory buffer device 150 meets the threshold of the preprogrammed packet size. When the threshold is satisfied, all of the packets stored in the memory buffer device 150 will be sent to the external memory device 120 (i.e., RDRAM) via successive write operations. Storing the multiple small packets in the memory buffer device 150 until the threshold is satisfied can enable the switch 100 to avoid incurring too many operational penalties, which may be assessed against a network for performing numerous successive WR operations for small-sized packets.

According to another embodiment of the invention, the system may also employ a look-ahead logic module 180 to preselect appropriate read pointer to avoid back-to-back RD and WR/RD penalty. The packets 110 may be dequeued to the switch fabric based on many factors such as priority, output queue congestion, etc. The invention provides a look-ahead logic module 180 that is built in the read request arbiter such that the system will select a read request having a conflict-free address from the previous RD or WR. Since all of the addresses are selected from independent and distinct link lists, the link lists are easily distinguished during arbitration. Alternatively, the look-ahead logic may be programmed to operate in conjunction with certain output queuing algorithms such as Weighted Round Robin or Weighted Fair Queuing, but the preselection scheme of the look-ahead logic need only be active when the current read selection causes a memory resource conflict with a previously selected memory bank.

In assigning a pointer 190 to a packet 110 and writing the packet 110 to the external memory device 120, the pointer assignment module 160 may use the look-head logic module 180 to select an address from one of the memory banks 130, located on the external memory device 120, in which to store the packet 110. Namely, the look-ahead logic module 180 determines which memory bank 130 of the external memory device 120 was previously accessed and selects an address of a memory bank so that no two successive WR or RD/WR operations will have an address from the same memory bank 130. By using the look-ahead logic module 180, the switch 100 will select a read request with a conflict-free address from a previous RD or WR operation. Once the look-ahead logic module 180 determines an appropriate memory bank 130 in which to assign the packet to, the pointer assignment module 160 assigns a pointer 190 associated with the respective memory bank 130 to the packet 110. The bits of the packet 110 are assigned to the memory banks by the number of rows in each array and the number of column in each array in the external memory device 120. The pointer assignment module 160, which functions as an address control register, may be provided in the internal memory control device for assigning the address to each of the packet 110 based upon the memory bank determined by the look-ahead module 180. When a read request is received to transfer the packet 110 from the external memory device 120, the switch 100 may use the pointer assignment scheme assigned by the pointer assignment module 160 to read the packet 110 back from the external memory device 120.

According to another embodiment of the invention, the switch 100, as shown in FIG. 1, replaces a conventional address re-mapping logic of, for example, a RDRAM with independent bank address pointer link lists. This embodiment provides an improved addressing method by creating independent address pointer link lists. The number of link lists required may be equal to the total number of memory banks employed in the network. Whenever a pointer's address is dequeued, the pointer may return to its own specific link list. Then every time a write (WR) address is needed for an incoming packet to assign the packet to the memory bank, a pointer allocator logic may select from any of the independent link lists to provide the address. Namely, the pointer allocator logic may determine in which bank the previous WR operation was performed, and the pointer allocator logic will select an alternate bank. This independent link list scheme guarantees that no two successive WR will have an address from the same bank. By employing the independent link list, the switch 100 may assure that the new WR addresses are no longer restricted by the order in which the packets are dequeued.

This description will initially provide a discussion of some exemplary components of the invention. Then, a discussion of an exemplary process that may employ the system will be provided.

FIG. 1 illustrates a switch 100 connected to an external memory device 120 or a data bank applicable to the invention. During operation, an input packet 110 is applied to an input port 140 from an input source (not shown). The input port 140 and the output port 145 of the switch 100 may be coupled to one or more physical layers via respective interfaces and optionally to a central processing unit (CPU) (not shown) in order to route the packet 110 through a switch 100 or external unit. This configuration may enable the switch 100 to control the exchange of a single packet or a plurality of packets 110 with any physical layers connected thereto. Various types of well-known devices may be incorporated into the invention for performing switching-related functions at various levels of the OSI 7-layer reference model. For example, hubs or repeaters may operate at layer one, and essentially copy and "broadcast" incoming data to a plurality of spokes of the hub. Layer two (L2) switching-related devices are typically referred to as multiport bridges, and are capable of bridging two separate networks. Bridges may be incorporated into the invention to build a table of forwarding rules based upon which MAC (media access controller) addresses exist on which ports of the bridge, and may pass the packets which are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer three switches, sometimes referred to as routers, may be employed to forward the packets based upon the destination network address. Layer three switches are capable of learning addresses and maintaining tables thereof which correspond to port mappings. Processing speed for layer three switches may utilize specialized high performance hardware, and off load the host CPU so that instruction decisions do not delay packet forwarding.

According to this embodiment, the MAC layer 170 selects the physical channels between networks and then establishes or releases connections on those channels. The MAC 170 also multiplexes and/or demultiplexes control information contained in the packets 110.

When the packet 110 is received by the input port 140, an ingress sub-module of the MAC 170 determines the destination of the packet 110. The control information of the packet 110 is buffered by the ingress sub-module and compared to data stored in the L2 lookup tables 210 to determine the destination port of the packet 110.

When the packet 110 is received by the input port 140, an ingress sub-module of the MAC 170 determines the destination of the packet 110. The control information of the packet 110 is buffered by the ingress sub-module and compared to data stored in the L2 lookup tables 210 to determine the destination port of the packet 110.

The switch 100 may be configured so that the MAC 170 communicates with the L2 lookup tables 210 so that all incoming packet processing may occur in the ingress sub-module of the MAC 170, and features such as the layer two (L2) lookups, layer two learning, both self-initiated and central processing unit initiated, layer two table management, and layer two switching may occur in the ingress submodule of the MAC 170.

After the lookups, the packet 110 is placed from ingress submodule of the MAC 170 into a dispatch unit of the MAC 170, and then placed onto an exit channel of the MAC so that the memory management of the packet 110 can be handled by an internal memory control device 200. However, if the ingress submodule of the MAC 170 determines that the incoming packet 110 is smaller than a preprogrammed packet size, the MAC 170 will temporarily store the packet 110 in a memory buffer device 150.

In one embodiment of the invention, the memory buffer device 150 may be configured so that the memory buffer device 150 is centralized so that it is a shared memory buffer device 150. Alternatively, the switch 100 may be designed so that each input port 140a-c is assigned to and attaches to a respective memory buffer device. The data stored in the memory buffer device 150 may be stored as packets, which are variable length of data, or cells, which are fixed-length of data. However, in the preferred embodiment, the data is stored in the memory buffer device as packets. As illustrated in the FIG. 1, the memory buffer device 150 connects to the internal memory control device 200, which handles the queue management of the packets 110, and is responsible for assigning a pointer 190 to an incoming packet, as well as assigning common packet identifications (CPIDs) once the packet is fully written into the memory bank 130 of the external memory device 120. The internal memory control device 200 can also handle the management of the on-the-switch free address pointer pool, control actual data transfers to and from the data pool, and provide memory budget management.

As discussed above, after the packet 110 is placed from the ingress submodule of the MAC 170 into a dispatch unit of the MAC 170 or placed from a dispatch unit of the memory buffer device 150, then the packet may be placed onto an exit channel for forwarding the packet 110 to the internal memory control device 200. The memory management of the packet 110 is handled by internal memory control device 200. A number of ingress buffers may be provided in the dispatch units of both the MAC 170 and the memory buffer device 150 to ensure proper handling of the packets 110.

The internal memory control device 200 may also perform the functions of on-the-switch FAP (free address pool) management and transfer of the packet 110 to the external memory device 120. Memory clean up, memory budget management, channel interface, and pointer assignment may also be functions of the internal memory control device 200.

Figure 2A:
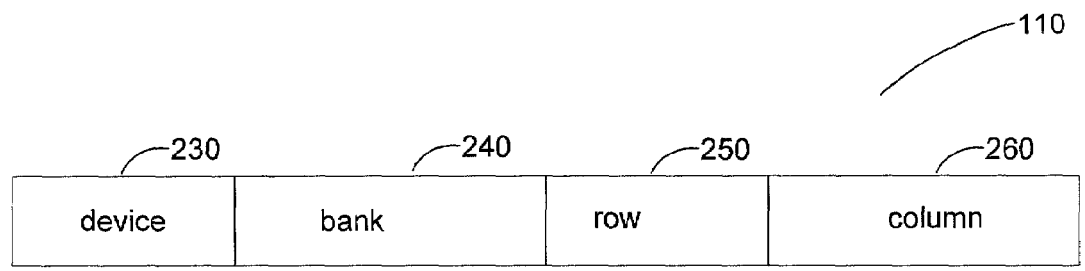
FIG. 2A depicts sample data fields of a data packet.
Figure 2B:
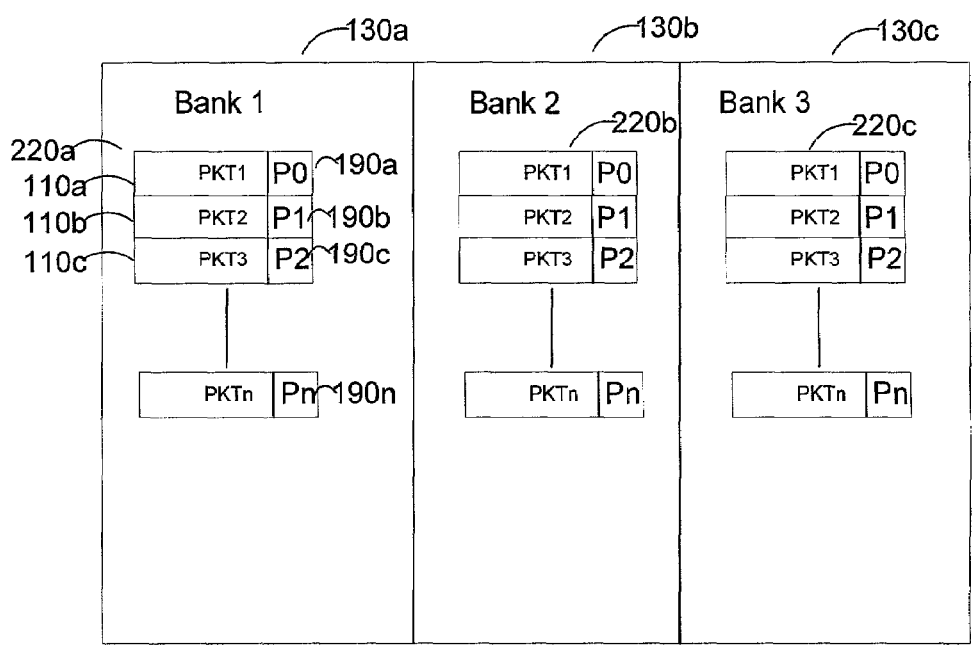
FIG. 2B is a link list scheme for assigning packets according to one embodiment of the invention.

The internal memory control device 200 may include the look-ahead logic module 180 and the pointer assignment module 160. As shown in FIG. 2B, associated with each bank is a link list 220, which is controlled by the pointer assignment module 180. Each link list is an index to one of the entries in the memory bank 130. The link lists 220a-c provide a link index addressing scheme to access the packet 110 after the packet 110 has been stored on the external memory device 120. The link list 220 assigns a pointer 190 to each incoming packet 110 so that the location of the packet 110 can be identified according to its order of assembly when a read request is received. Since a link list 220 is associated with each individual bank 130, when a pointer 190 is assigned to an incoming packet 110, the selection of the pointers 190 can be made from each individual link list and not from one central link list.

In assigning a pointer 190 to a packet 110 and writing the packet 110 to the external memory device 120 when a write request is received by the switch 100, the pointer assignment module 160 may use the look-ahead logic module 180 to select an address from one of the memory banks 130, located on the external memory device 120, in which to store the packet 110. Namely, the look-ahead logic module 180 remembers which memory bank 130 of the external memory device 120 was previously accessed for either a read or write operation and selects an address of a memory bank so that no two successive WR or RD/WR operations will have an address from the same memory bank 130. By using the look-ahead logic module 180 in the read request arbitrator, the switch 100 will select a read request with a conflict-free address from a previous RD or WR operation. The look-ahead logic module 180 writes into the control information of the packet 110 so that the bits of the packet 110 are assigned to the memory banks 130 by the number of rows in each array and the number of column in each array in the external memory device 120, as shown in FIG. 2A. The look-ahead logic module 180 may write in the device field 230, the bank field 240, the row field 250, and the column field 260. The device field 230 selects the device, for instance, the external memory device 120, to which the packet 110 is being transferred. The bank field 240 selects a memory bank from the external memory device 120 in which the packet 110 is to be stored. The row field 250 designates the row of the memory bank 130 to assign the packet 110. Likewise, the column field 260 designates the column of the memory bank 130 to assign the packet 110.

Once the look-ahead logic module 180 determines an appropriate memory bank 130 to which to assign the packet, the pointer assignment module 160 assigns a pointer 190 associated with the respective memory bank 130 to the packet 110. The pointer 190 may be stored, for example, as a two-byte or sixteen bit value network control information field (NC_header), within the packet 190. Thus, the pointer assignment module 160 functions as an address control register for assigning the address to each of the packet 110 based upon the memory bank determined by the look-ahead module 180.

After the pointer 190 has been assigned to the packet 110, the packet is transferred to the external memory device 120 during a write operation.

With respect to the free address pool, the internal memory device 200 manages the free address pool and assigns free pointers 190 to incoming packets. When a pointer 190 has been released after a read request has been completed to transfer the packet 110 from the external memory device 120, the pointer assignment module 160 of the internal memory device 200 reassigns the pointer 190 to its respective link list 220 and updates the free address pool of the internal memory control device 200.

Figure 3A:
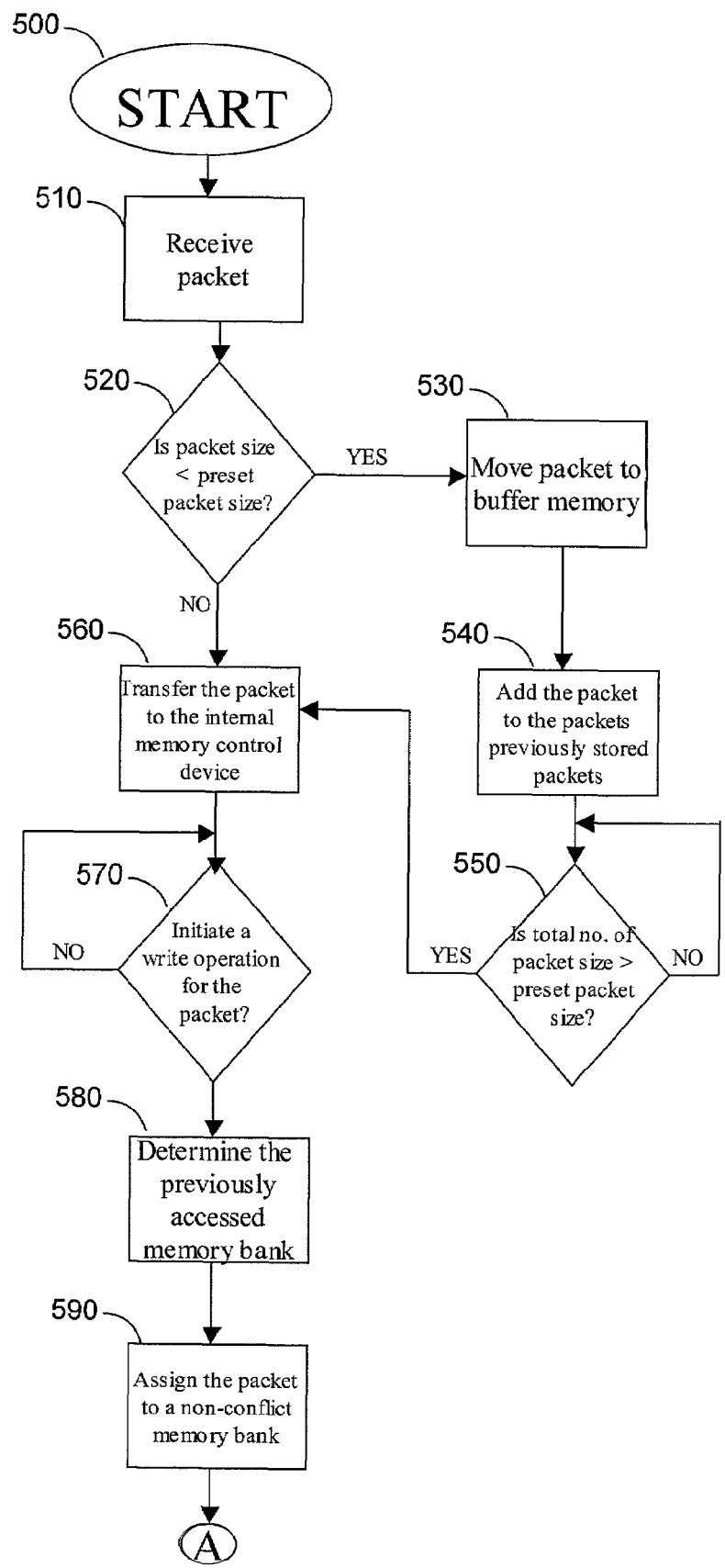
FIGS. 3A and 3B are flow charts illustrating one example of the method according to the invention.
Figure 3B:
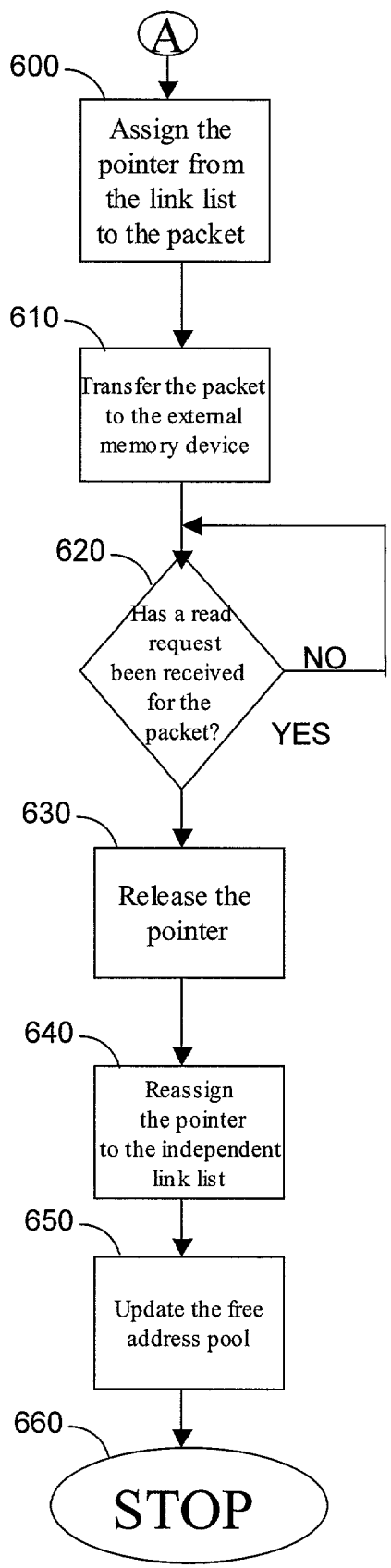

FIGS. 3A and 3B illustrate an example of the process using the switch 100 according to one embodiment of the invention. As shown in FIG. 3A, the process begins at step 500.

In step 510, an input port 140 of the switch 100 receives the packet 110. In step 520, the switch 100 determines if the size of the packet is less than the preset packet size.

If the response to step 520 is positive, the packet 110 is transferred to a memory buffer device 150 for temporary storage. The process advances to step 540 and adds the packet 110 to the packets already stored in the memory buffer device 150 to generate a total number packet size. In step 550, if the total number packet size is still smaller than the preset packet size, the process rechecks the total number packet size as each packet 110 is added to the memory buffer device.

If the response in step 520 is negative or if the response in step 550 is positive, the process advances to step 560 and transfers the packet 110 to the internal memory control device 200. In step 560, the process begins to perform a write operation to transfer the packet 110 to the external memory device 120.

In step 580, in writing the packet 110 to the external memory device 120, the look-ahead logic module of the switch 100 remembers which memory bank 130 was previously accessed for either a read or a write operation. In step 590, the look-ahead logic module 180 assigns the packet 110 to a non-conflicting memory bank 130 so that no two successive WR or RD/WR operations will have an address from the same memory bank 130.

Once the look-ahead logic module 180 in step 590 determines an appropriate memory bank in which to assign the packet 110. In step 600, the pointer assignment module assigns a pointer 190 associated with the memory bank selected by the look-ahead logic module 180 is assigned to the packet 110.

After the pointer 190 has been assigned to the packet 110 in step 600, the packet is transferred to the external memory device 120 in step 610. In step 620, the process checks to determine whether a read request has been received to transfer the packet 110 from the external memory device 120. Once the read request is completed, the process advances to step 630 and releases the pointer in step 630 and returns the pointer 190 back to its independent link list. Then, the process moves to step 650 and updates the free address pool.

Although FIG. 3B indicates the end of the process in step 660, the process disclosed in FIGS. 3A-3B is iterative. Thus, the process may be repeated until all of the packets have been assigned to the memory banks, have been transferred from the external memory device 120, the pointers have been released and the free address pool has been updated.

In sum, some of the advantages offered by the invention might include, first, using independent data bank link list in order to guarantee that no two successive WR or RD/WR will have an address from the same bank. Therefore, new WR addresses are no longer restricted by the order in which the packets are dequeued. Thus, many unnecessary stall cycles can be avoided. Second, by adding a look-ahead logic that is in the read request arbitrator such that it will select a read request with a conflict-free address from the previous RD or WR, thus turn around cycles between RD/RD, WR/RD can be avoided and a higher memory bandwidth is obtained. Third, by adding a minimum threshold requirement for the RxFIFO and allowing multiple successive small packet write operations, the invention keeps the memory bandwidth up even when the input packets are small-sized packet.

In addition, the communication device, i.e., switch 100, of the invention may be configured to work in conjunction in with or in place of an existing conventional memory device. However, the look-ahead logic module 180 of the invention may be configured to override any packet-addressing scheme that permits two successive operations to have an address from the same memory bank. For instance, the switch 100 may be configured to operate with a RDRAM memory device, which employs an address swapping scheme. However, if the RDRAM memory device swaps the addresses of two successive packets so that both packets are assigned to the same memory bank, the look-ahead logic module 180 of the switch 100 may be configured to override the RDRAM's mapping scheme and assign the packet to a conflict-free address.

Alternatively, the look-ahead logic module 180 of the communication device may be preprogrammed so that each memory bank has a write operation percentage threshold so that the number of write operations written during a predetermined time interval may not exceed the percentage threshold for the memory bank. Namely, the look-ahead module may also implement its look-ahead function to prevent access to a particular memory bank until the write operation percentage falls below the memory bank's access threshold.

Alternatively, in another embodiment, the look-ahead module 180 of the communication device may be programmed so that each memory bank is accessed according to a particular write operation scheme. For instance, during a predetermined number of write operations, the look-ahead module 180 may be programmed so that memory bank 130a, as shown in FIG. 2B, is accessed every third write operation and memory bank 130c is written to on every fifth write operation. Namely, the look-ahead module 180 may be preprogrammed so that the address assignment scheme is programmed to access the memory banks according to an assignment scheme which may be varied according to the demands imposed upon the system and depending upon the time of the day.

In addition, the communication device may be configured to operate in conjunction with a round robin scheme or based on a priority queuing scheme. However, when the address selection of either the round robin scheme or the priority queuing scheme selects a bank address that conflicts with a previous RD or WR and current RD address, the look-ahead logic module 18 of the invention will override the selection of either the round robin scheme or the priority queuing scheme to select and assign the packet to a conflict-free address.

Furthermore, in the embodiments of the invention which employ, for example, the RDRAM architecture, the invention may accommodate an OC-192 link rate. Each RDRAM channel can support a maximum transfer rate of approximately 12.8 Gbps (gigabits per second). In order to accommodate the requirements of the OC-192 application, the memory of the invention may accommodate at least 10 Gbps traffic in and 10 Gbps traffic out. Thus, the invention may employ, for example, two channels, which may provide up to 25.6 Gbps peak bandwidth, to accommodate a 20 Gbps total bandwidth. The sustained bandwidth, however, may depend on the channel utilization efficiency.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

I claim:

1. A communication device comprising:
   an input port for receiving a data packet entering the communication device;
   a look-ahead logic module configured to select an address of a first memory bank of an external memory device, wherein the look-ahead logic module is contained within an internal memory control device located within the communication device;
   a pointer assignment module, connected to the look-ahead module, is configured to include an independent link list assigned exclusively to the first memory bank and to assign a pointer to the data packet based upon the first memory bank as determined by the look-ahead logic;
   the internal memory control device configured to transfer the data packet to the external memory device; and
   the pointer assignment module configured to return the pointer to the independent link list and update a free address pool when the pointer has been released after the data packet has been transferred from the external memory device.

2. The communication device as recited in claim 1, wherein the communication device comprises a switch.

3. The communication device as recited in claim 1, wherein the previous request operation is a write request.

4. The communication device as recited in claim 1, wherein the previous request operation is a read request.

5. The communication device as recited in claim 1, further comprising:
   a medium access control (MAC) protocol module having a MAC address for transmitting the data packet, wherein the MAC connects to the internal memory device;
   a layer two switching module configured to build a table of forwarding rules upon which the MAC addresses exist and to determine a packet size of the data packet, wherein the layer two switching module connects to the MAC; and
   a memory buffer device, connected to the MAC, is configured to temporarily store the data packet if the packet size is smaller than a predetermined packet size.

6. The communication device as recited in claim 5, wherein the memory buffer device is further configured to aggregate the packet size of each successive data packet to generate data relating to a total packet size.

7. The communication device as recited in claim 6, wherein the memory buffer device is further configured to transfer each data packet stored therein to the internal memory control device when the total packet size exceeds the predetermined packet size.

8. A communication device comprising:
an input port for receiving the data packet entering the communication device;
a look-ahead logic module configured to override and assign a swapping address mapping scheme to select an address of a first memory bank of a memory device so that the data packet will not be assigned to a memory bank accessed in a previous request operation wherein the look-ahead logic module is contained within an internal memory control device located within the communication device;
a pointer assignment module, connected to the look-ahead module, is configured to assign a pointer to the data packet based upon the first memory bank determined by the look-ahead logic module; and
an output port, connected to the communication device, is configured to transfer the data packet to the memory bank of the memory device.

9. The communication device as recited in claim 8 wherein the communication device comprises a switch.

10. The communication device as recited in claim 8, wherein the previous request operation is a write request.

11. The communication device as recited in claim 8, wherein the previous request operation is a read request.

12. The communication device as recited in claim 8, further comprising:
a medium access control (MAC) protocol module having a MAC address for transmitting the data packet, wherein the MAC connects to the internal memory device;
a layer two switching module configured to build a table of forwarding rules upon which the MAC addresses exist and to determine a packet size of the data packet, wherein the layer two switching module connects to the MAC; and
a memory buffer device, connected to the MAC, configured to temporarily store the data packet if the packet size is smaller than a predetermined packet size.

13. The communication device as recited in claim 12, wherein the memory buffer device is further configured to aggregate the packet size of each successive data packet to generate data relating to a total packet size.

14. The communication device as recited in claim 13 wherein:
the memory buffer device is configured to transfer each data packet stored therein to a memory control device when the total packet size exceeds the predetermined packet size; and
the memory control device includes the look-ahead logic module.

15. A communication device comprising:
a look-ahead logic module configured to select an address of a first memory bank of a memory device so that no two successive request operations access the same memory bank wherein the look-ahead logic module is contained within an internal memory control device located within the communication device;
a pointer assignment module, connected to the look-ahead module, is configured to assign a pointer to the data packet based upon the first memory bank determined by the look-ahead logic module; and
an output port, connected to the communication device, is configured to transfer the data packet to the memory bank of the memory device.

16. The communication device as recited in claim 15, wherein the communication device comprises a switch.

17. The communication device as recited in claim 15, wherein the successive request operations are two successive write requests to access the same memory bank.

18. The communication device as recited in claim 15, wherein the successive request operations include a read request followed by a write request to access the same memory bank.

19. A communication device comprising:
a look-ahead logic module configured to select an address of a first memory bank of a memory device so that no two successive request operations access the same memory bank wherein the look-ahead module is contained within an internal memory control device located within the communication device;
a link list configured to include multiple independent link lists, wherein each link list is assigned exclusively to a predetermined memory bank located within the communication device;
a pointer assignment module, connected to the look-ahead module, is configured to assign a pointer from one of the independent link lists to the data packet based upon the first memory bank determined by the look-ahead logic module; and
an output port, connected to the communication device, is configured to transfer the data packet to the memory bank of the memory device.

20. The communication device as recited in claim 19, further comprising:
a medium access control (MAC) protocol module having a MAC address for transmitting the data packet, wherein the MAC connects to the internal memory device;
a layer two switching module configured to build a table of forwarding rules upon which the MAC address exist and to determine a packet size of the data packet, wherein the layer two switching module connects to the MAC; and
a cycle burst module configured to transfer the data packet to a memory buffer device if the packet size is smaller than a predetermined packet size to avoid a small packet write penalty, wherein the memory buffer device connects to the MAC.

21. The communication device as recited in claim 20, wherein the memory buffer device is further configured to aggregate the packet size of each successive data packet to generate data relating to a total packet size.

22. The communication device as recited in claim 21, wherein:
the memory buffer device is configured to transfer each data packet stored therein to a memory control device when the total packet size exceeds the predetermined packet size; and
the memory control device is configured to include the look-ahead logic module.

23. A method of assigning a data packet to a memory bank of an external memory device, the method comprising:
receiving the data packet at an input port of a communication device;
selecting an address of the memory bank of the external memory bank so that the data packet will not be assigned to a memory bank accessed in a previous request operation;
providing an independent link list assigned exclusively to the memory bank;

assigning a pointer to the data packet based upon the memory bank determined by the look-ahead logic;
transferring the data packet to the external memory device; and
returning the pointer to the independent link list and update a free address pool when the pointer has been released after the data packet has been transferred from the external memory device.

24. The method as recited in claim 23, wherein the communication device is a switch.

25. The method as recited in claim 23, wherein the previous request operation is a write request.

26. The method as recited in claim 23, wherein the previous request operation is a read request.

27. The method as recited in claim 23, further comprising: storing the data packet temporarily in a memory buffer device if the packet size is smaller than a predetermined packet size.

28. The method as recited in claim 27, further comprising: aggregating the packet size of each successive data packet to generate a total packet size.

29. The method as recited in claim 28, further comprising: transferring each data packet stored within the memory buffer device to the internal memory control device when the total packet size exceeds the predetermined packet size.

30. A method of assigning a data packet to a memory bank of a memory device, the method comprising:
receiving the data packet at an input port of a communication device; overriding a swapping address mapping scheme to select and assign an address of the memory bank of the memory device so that the data packet will not be assigned to a memory bank accessed in a previous request operation;
assigning a pointer to the data packet based upon the address of the memory bank determined; and
transferring the data packet to the memory bank of the memory device.

31. A method of assigning a data packet to a memory bank of a memory device, the method comprising:
receiving the data packet at an input port of a communication device;
selecting an address of the memory bank of the memory device so that no two successive request operations access the same memory bank;
assigning a pointer to the data packet based upon the memory bank determined by the look-ahead logic module; and
transferring the data packet to the memory bank of the memory device.

32. The method as recited in claim 31, wherein the communication device is a switch.

33. The method as recited in claim 31, wherein the successive request operations are two successive write requests to access the same memory bank.

34. The method as recited in claim 31, wherein the successive request operations include a read request followed by a write request to access the same memory bank.

35. A method of assigning a data packet to a memory bank of a memory device, the method comprising:
receiving the data packet at an input port of a communication device; selecting an address of the memory bank of the memory device so that no two successive request operations access the same memory bank;
providing a link list configured to include multiple independent link lists, wherein each link list is assigned exclusively to a predetermined memory bank;
assigning a pointer from one of the independent link lists to the data packet based upon the memory bank determined by the look-ahead logic module; and
transferring the data packet to the memory bank of the memory device.

36. The method as recited in claim 35, further comprising:
providing a cycle burst module configured to transfer the data packet to a memory buffer device if the packet size is smaller than a predetermined packet size to avoid a small packet write penalty.

37. A communication device comprising:
receiving means for receiving the data packet at an input port of a communication device, entering the communication device;
selecting means for selecting an address of a first memory bank of the external memory bank so that the data packet will not be assigned to a memory bank accessed in a previous request operation;
providing means for providing an independent link list assigned exclusively to the first memory bank;
assigning means for assigning a pointer to the data packet based upon the first memory bank determined by the look-ahead logic;
transferring means for transferring the data packet to an external memory device; and
returning means for returning the pointer to the independent link list and updating a free address pool when the pointer has been released after the data packet has been transferred from the external memory device.

38. The communication device as recited in claim 37, wherein the communication device comprises a switch.

39. The communication device as recited in claim 37, wherein the previous request operation is a write request.

40. The communication device as recited in claim 37, wherein the previous request operation is a read request.

41. The communication device as recited in claim 37, further comprising: storing means for storing the data packet temporarily in a memory buffer device if the packet size is smaller than a predetermined packet size.

42. The network as recited in claim 41, further comprising:
aggregating means for aggregating the packet size of each successive data packet to generate a total packet size.

43. The communication device as recited in claim 42, further comprising:
transferring means for transferring each data packet stored within the memory buffer device to the internal memory control device when the total packet size exceeds the predetermined packet size.

44. A communication device comprising:
receiving means for receiving the data packet at an input port of a communication device;
overriding means for overriding a swapping address mapping scheme to select and assign an address of the memory bank of a first memory device so that the data packet will not be assigned to the memory bank accessed in a previous request operation;
assigning means for assigning a pointer to the data packet based upon the address of the memory bank determined; and
transferring means for transferring the data packet to the memory bank of the first memory device.

45. A communication device comprising:
receiving means for receiving the data packet at an input port of a communication device;

selecting means for selecting an address of a first memory bank of a memory device so that no two successive request operations access the same memory bank;

assigning means for assigning a pointer to the data packet based upon the first memory bank determined by the look-ahead logic module; and transferring means for transferring the data packet to the first memory bank of the memory device.

46. The communication device as recited in claim 45, wherein the communication device comprises a switch.

47. The communication device as recited in claim 45, wherein the successive request operations are two successive write requests to access the same memory bank.

48. The communication device as recited in claim 45, wherein the successive request operations include a read request followed by a write request to access the same memory bank.

49. A communication device comprising:

receiving means for receiving the data packet at an input port of a communication device;

selecting means for selecting an address of a first memory bank of a memory device so that no two successive request operations access the same memory bank;

providing means for providing a link list configured to include multiple independent link lists, wherein each link list is assigned exclusively to a predetermined memory bank;

assigning means for assigning a pointer from one of the independent link lists to the data packet based upon the first memory bank determined by the look-ahead logic module; and transferring means for transferring the data packet to the first memory bank of the memory device.

50. The communication device as recited in claim 49, further comprising:

providing means for providing a cycle burst module configured to transfer the data packet to a memory buffer device if the packet size is smaller than a predetermined packet size to avoid a small packet write penalty.

51. A communication device comprising:

an input port for receiving the data packet entering the communication device;

a look-ahead logic module configured to select an address of a first memory bank of a memory device by overriding an address mapping scheme that permits successive data packets to be assigned to the same memory bank, wherein the look-ahead logic module is contained within an internal memory control device located within the communication device;

a pointer assignment module, connected to the look-ahead module, is configured to assign a pointer to the data packet based upon the memory bank determined by the look-ahead logic module; and an output port, connected to the communication device, is configured to transfer the data packet to the memory bank of the memory device.

52. The communication device as recited in claim 51, wherein the mapping scheme is an address swapping mapping scheme.

53. A method of assigning a data packet to a memory bank of a memory device, the method comprising:

receiving the data packet at an input port of a communication device; selecting an address of the memory bank of the memory device by overriding an address mapping scheme that permits successive data packets to be assigned to the same memory bank;

assigning a pointer to the data packet based upon the memory bank determined by the look-ahead logic module; and transferring the data packet to the memory bank of the memory device.

54. The method as recited in claim 53, wherein the mapping scheme is an address swapping mapping scheme.

55. A communication device comprising:

receiving means for receiving the data packet at an input port of a communication device;

selecting means for selecting an address of a first memory bank of a memory device by overriding an address mapping scheme that permits successive data packets to be assigned to the same memory bank;

assigning means for assigning a pointer to the data packet based upon the first memory bank determined by the look-ahead logic module; and transferring means for transferring the data packet to the first memory bank of the memory device.

56. The communication device as recited in claim 55, wherein the mapping scheme is an address swapping mapping scheme.

* * * * *